Sept. 11, 1934.  T. BROWN  1,973,048
TRACTOR
Filed Nov. 8, 1933  3 Sheets-Sheet 1
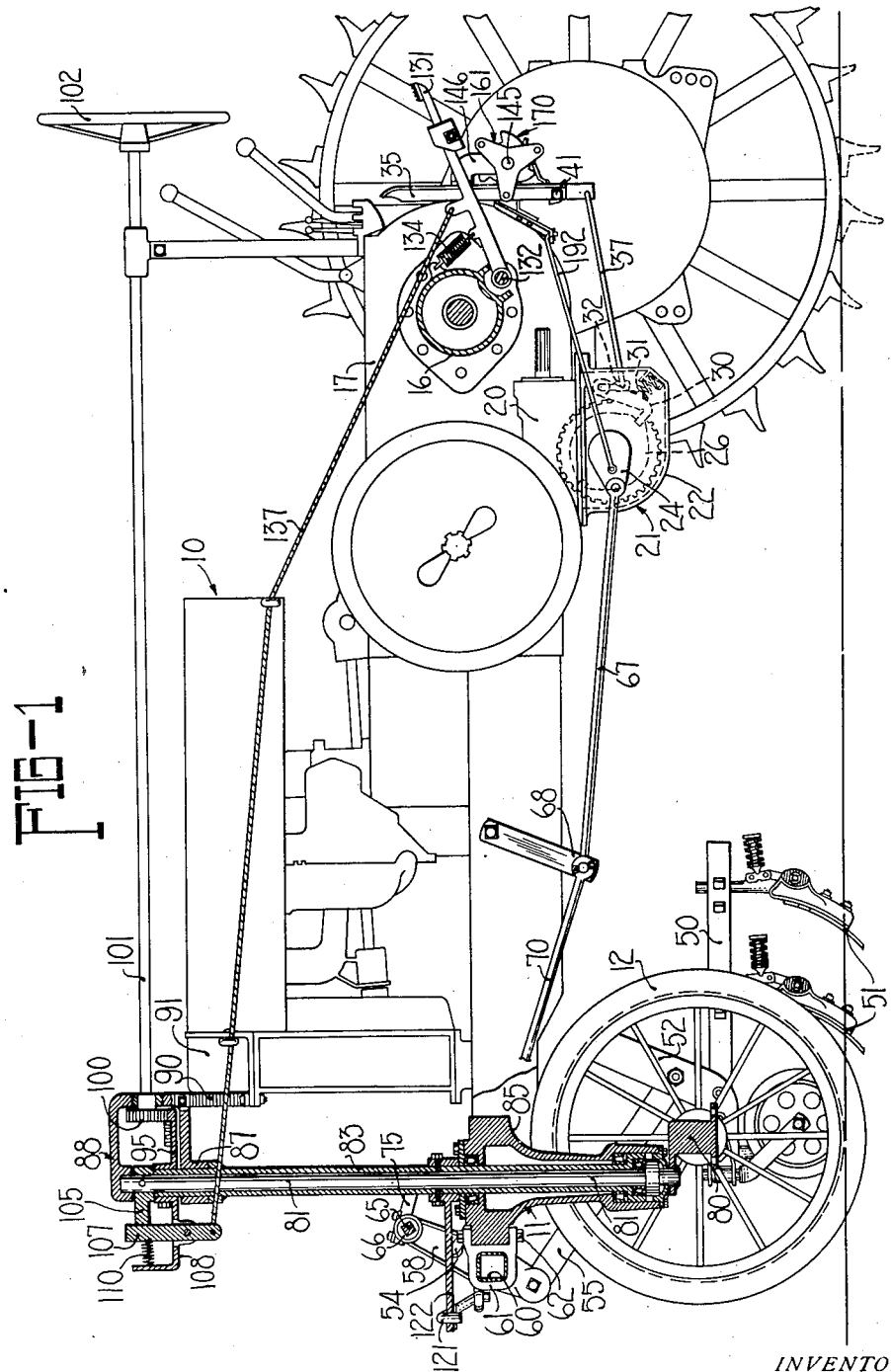
INVENTOR
Theophilus Brown
BY
Brown, Jackson, Boettcher & Dienner
ATTORNEYS.

Sept. 11, 1934.                T. BROWN                    1,973,048
                                TRACTOR
                         Filed Nov. 8, 1933          3 Sheets-Sheet 2
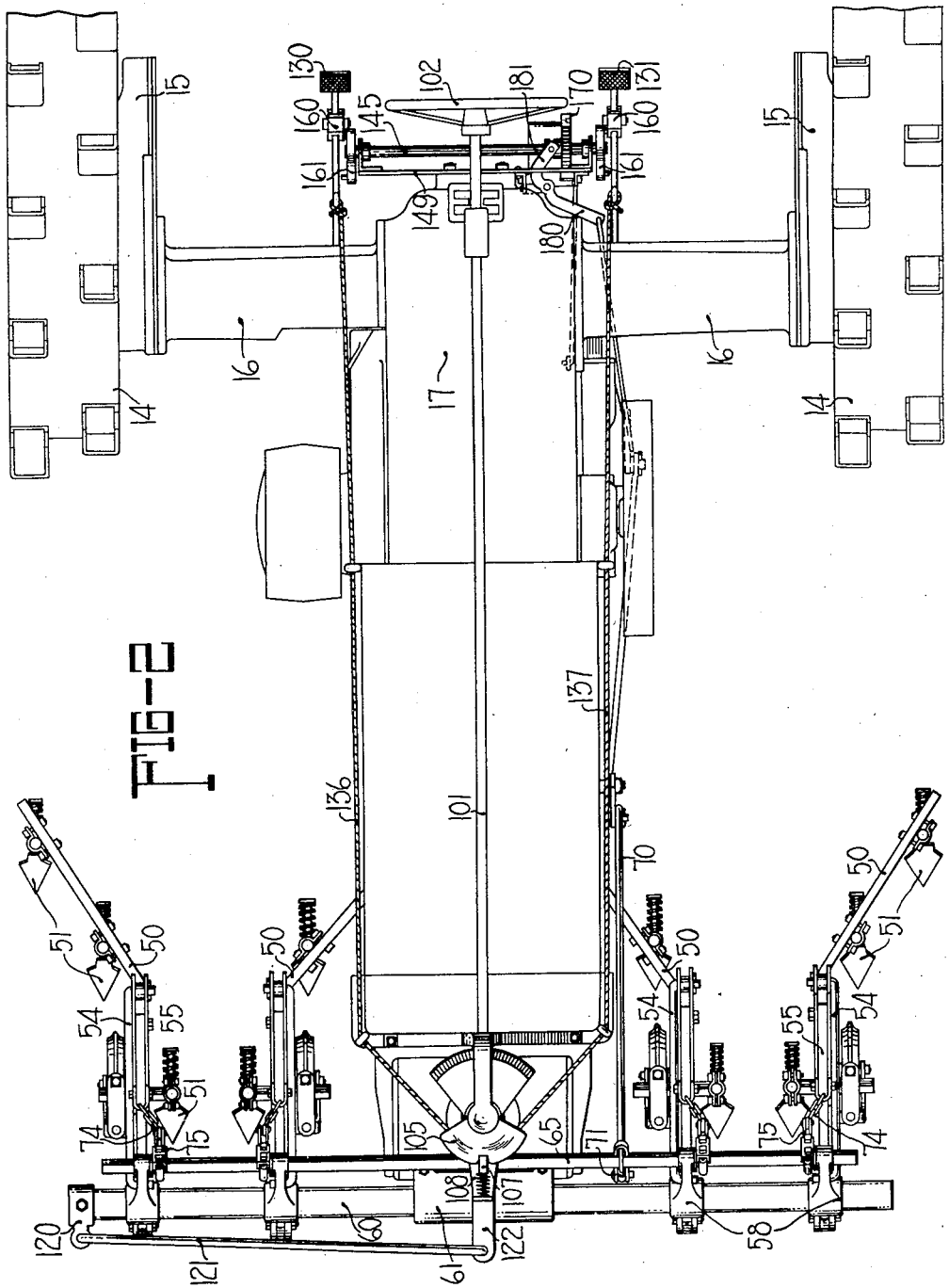
INVENTOR
Theophilus Brown
BY Brown, Jackson, Boettcher & Drenner
ATTORNEYS.

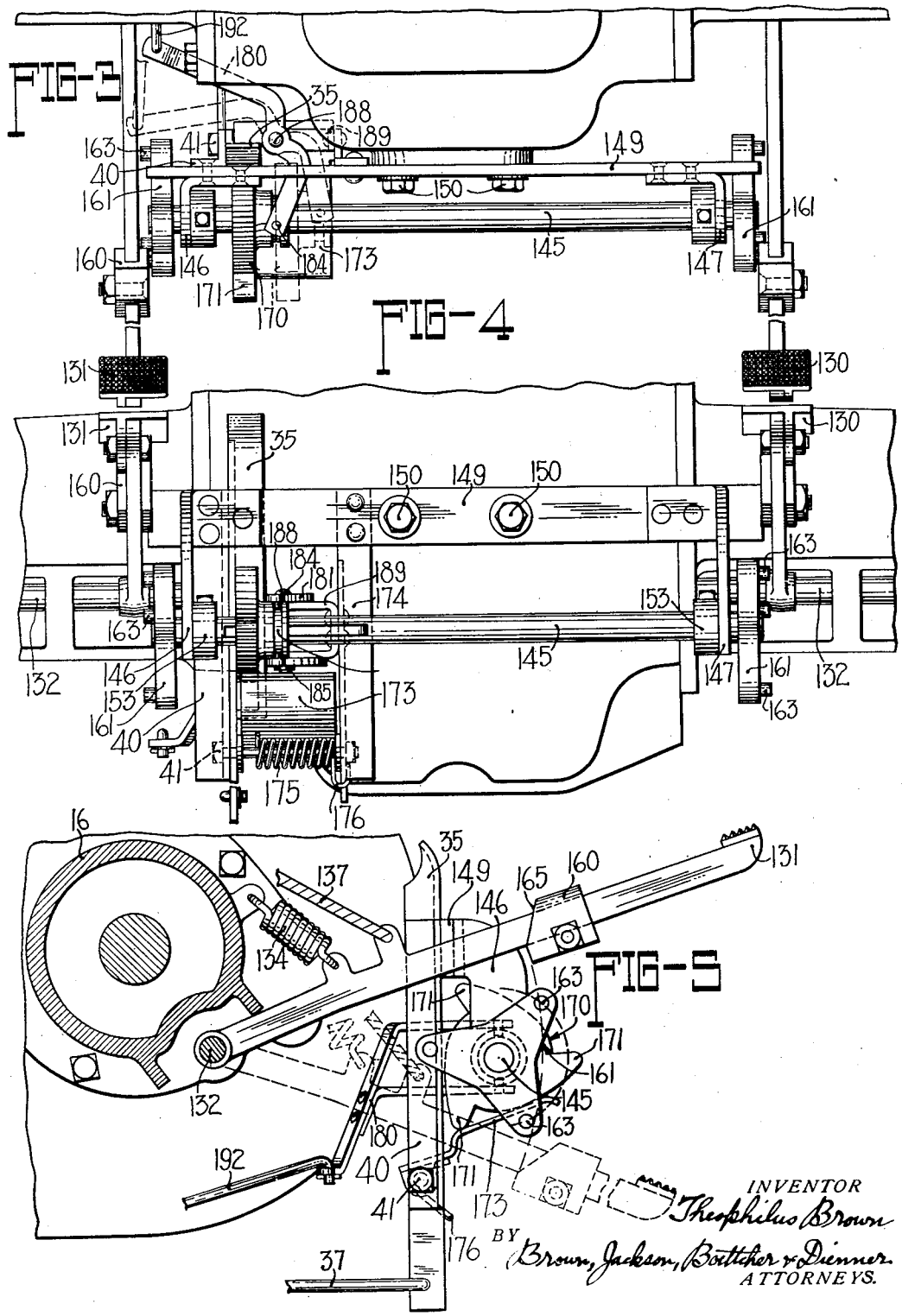

Patented Sept. 11, 1934

1,973,048

UNITED STATES PATENT OFFICE 1,973,048

TRACTOR

Theophilus Brown, Moline, Ill., assignor to Deere & Company, Moline, Ill., a corporation of Illinois Application November 8, 1933, Serial No. 697,108

20 Claims. (Cl. 97—50)

The present invention relates generally to tractors and the like and is particularly concerned with such machines wherein means facilitating the making of sharp turns and the like in steering is provided. Also, the present invention is particularly concerned with tractors and the like adapted to support or propel implement or operating units.

In the present type of tractor now in general use for purposes including those mentioned above, the tractor is generally wheel supported and is provided with a front steering truck and rear traction wheels, and it is not possible to make a very sharp turn without operating one or the other of the brakes associated with the rear wheels and the differential mechanism for driving the same. For example, in some tractors the traction wheel at one side may be locked by suitable brake means so that all of the power will be diverted to the traction wheel on the other side, thus greatly facilitating the steering of the tractor around a sharp turn. Other types of tractors, not necessarily wheel supported, are operated in a similar manner in making a sharp turn. Tractors of the track-laying type may also be provided with brake means or some form of clutch mechanism associated with each of the traction elements for the purpose of interrupting the drive to either traction element so as to divert all or at least a greater proportion of the drive to the opposite traction element for the purpose of steering the tractor.

Implements and other operating units are frequently propelled by or supported directly upon tractors of the kind mentioned above, and generally such implements and operating units include portions which are shiftable into and out of operative positions. Whenever a sharp turn is made with a tractor, any implement connected therewith, either at the front end or at the rear end, should be in inoperative position. Generally, such inoperative position is one in which the soil engaging tools or other operative units are in lifted relation and out of contact with the ground. If an attempt is made to make a very short turn with a tractor when the tools or operating unit or units are in lowered position, serious damage may result.

In view of the factors mentioned above, one of the principal objects of the present invention is the provision of means for initiating the operation of raising the tools or other operative units to inoperative position, which initating means is responsive to the operation of the steering mechanism capable of effecting a sharp turn. Another object of the present invention is to utilize the usual power lift of the tractor in automatically shifting the tools or other operating units to their inoperative position by the operation of the steering means of the tractor.

Still further, another object of the present invention is the provision of means rendering the connections between the steering means capable of effecting a sharp turn and the shifting means for the tools or other operating units inoperative, so far as any shifting of the tools or units is concerned, where the tools or units have already been shifted to their inoperative position. An additional object of the present invention is the arrangement of tool shifting means in connection with means for disabling the normal steering means of wheel supported tractors whenever the tractor is to be steered around a relatively sharp turn.

Wheel supported tractors of the type with which the present invention is particularly concerned embody dirigible means in the form of a front truck or the like and manually controlled means for steering the truck, in connection with traction elements on opposite sides of the tractor and differential means or the equivalent for delivering power to both of the traction elements in such a manner that the normal control of the tractor through the dirigible means can be effected without disturbing the drive. In such tractors, special arrangements are provided for swinging the tractor about a sharp turn, and generally such arrangements include some means for diverting all of the power to one of the traction elements at one side of the tractor, and in some cases holding the other traction element stationary while freeing the normally manually controlled dirigible steering means from its manual control and allowing the same to swing sharply in a lateral direction to accommodate the sharp turn desired. It is also frequently desirable, especially when mounting operative tools directly on the tractor, to arrange such tools to be shifted laterally with the normal operation of the dirigible means through actuation of the ordinary manually controlled steering wheel or the like, as when the machine is arranged for row following operation.

In connection with tractors of this kind, the present invention further contemplates the provision of not only lifting the tools to inoperative position whenever the steering mechanism for the traction elements is put to operation to turn the tractor sharply, but also the present invention contemplates automatic means for removing the tools, so far as their lateral shifting is concerned, from their connection with the dirigible means of the tractor, so that the latter can swing freely to one side or the other while affecting the sharp turn of which the machine is capable by the actuation of the steering mechanism associated with the traction elements. Further, in constructions of this sort, the present invention also contemplates arranging the connections so that, where the manual steering means is normally operative to shift the dirigible means of the tractor and at the same time control the lateral position of the operating tools, whenever the sharp turn steering mechanism is put into operation the lateral shifting means for the tools is left connected with the manual steering means so that, although the dirigible means of the tractor may swing freely, such disconnection of the tools from the tractor dirigible means does not relinquish all control of the lateral position of the tools, since the tools are still capable of being controlled by the manual steering wheel. Such control, however, does not affect the ability of the tractor to make sharp turns.

More specifically, the present invention is particularly concerned with row following tractors and the like having differential brake means for effecting sharp turns and adapted to support and propel cultivator rigs or the like which are arranged to be shifted laterally as the tractor is steered and which are adapted to be raised and lowered by the usual power lift of the tractor. In this connection it is the object of the present invention to provide a tractor wherein the dirigible means, usually in the form of a steering truck, is automatically disconnected from the usual steering wheel whenever either of the differential brakes is operated to effect a sharp turn. It is also an object of the present invention to provide such a tractor with cultivator rigs which are shifted laterally in response to the normal steering of the tractor and in which the cultivator rigs remain connected with the manually operated steering wheel at all times, including the time when the steering truck or dirigible means of the tractor is disconnected from the steering wheel whenever the differential brake means is brought into use to effect sharp turns beyond the range of the ordinary manual steering means.

Thus, inasmuch as the connection between the cultivator rigs and the manual steering wheel of the tractor is effectively retained, the cultivator rigs may be prevented from shifting laterally promiscuously within the limits of their shifting movement by merely holding the steering wheel of the tractor.

These and other objects and advantages of the present invention will be apparent to those skilled in the art after a careful consideration of the following detailed description of the preferred embodiment, illustrated in the accompanying drawings, in which:

Figure 1 is a vertical longitudinal section, certain of the parts being shown in elevation, taken through a machine embodying the principles of the present invention;

Figure 2 is a top plan view of the machine shown in Figure 1;

Figure 3 is a fragmentary enlarged view looking down on the mechanism by which operating the differential brakes automatically raises the tools or other operating units, places them under the exclusive control of the hand steering means, and disconnects the hand steering means and the tools from the front steering truck;

Figure 4 is a rear elevation of the mechanism shown in Figure 3; and

Figure 5 is an end view of the mechanism shown in Figures 3 and 4.

Referring now more particularly to Figures 1 and 2, the reference numeral 10 illustrates a more or less conventional tractor of the type embodying dirigible means in the form of a front steering truck 11 provided with front wheels 12 supporting the forward end of the tractor 10 and traction elements at each side of the tractor in the form of rear wheels 14 supported by drive housings 15 carried at the laterally outer end of tubular housings 16 which are secured to the body 17 of the tractor. The tractor 10 is provided with a power take off 20 and a power lift 21, including a casing 22 in which is journaled a longitudinally swinging crank or power lift arm 24 which is controlled by half revolution clutch mechanism 26 of more or less well known construction. The clutch 26 of the power lift 21 embodies a pivoted detent 30 which is biased for movement in one direction by means of a spring 31 or the equivalent. An arm 32 is rigidly connected with the detent 30 and is adapted to be actuated by a trip lever 35 connected with the arm 32 by means of a link 37. The trip lever 35 is pivotally arranged on a bracket 40, as best shown in Figure 4, by means of a pivot bolt 41. The bracket 40 is carried on the tractor.

In the construction chosen to illustrate the principles of the present invention, the tractor 10 carries at the forward end thereof operating units in the form of cultivator rigs 50 having tools in the form of shovels 51 secured thereto. Each of the cultivator rigs 50 includes vertical plates 52 and is supported for vertical movement by means of upper and lower links 54 and 55 pivotally connected at their lower ends to the plates or bars 52 and at their upper ends to castings or brackets 58 rigidly secured to a transverse draft bar in the form of a pipe member 60. The draft bar 60 is supported for lateral bodily movement transversely of the tractor in a casting 61 fixed to the front end of the tractor by bolts or the like 62. The cultivator rigs 50 are raised and lowered by means of a rock shaft 65 journaled for rotation in suitable bearings 66 carried at the upper ends of the brackets 58. The rock shaft 65 is operated through a connection with the swinging crank arm 24 of the power lift 21, said connection comprising a link 67 pivotally connected at its rear end with the crank arm 24 and at its forward end with a swinging link 68 from which extends forwardly a second link or rod 70 which, in turn, is pivoted to an arm 71 secured to the rock shaft 65, as best shown in Figure 2.

Thus, whenever the trip lever 35 is actuated to withdraw the detent 30, the power lift crank arm 24 is swung through substantially 180 degrees and, in doing so, exerts a pull on the links 67 and 70 which serves to rock the shaft 65 and raise the tools, each of the cultivator rigs 50 being connected with the rock shaft 65 by means of chains 74 and arms 75 secured to the rock shaft.

The front steering truck 11 of the tractor, according to the present invention, comprises an axle 80 fixed to a vertical shaft 81 journaled in a hollow tubular spindle 83 by suitable bearing means. The tubular spindle 83 is, in turn, journaled for rotation in a sleeve casting 85 fixed to the front end of the tractor, and the tubular spindle 83 is also journaled for rotation on a bearing sleeve 87 formed on a casting 88 or the like suitably secured to the tractor, as by means of a bracket 90 supported on the radiator casting 91.

The tubular spindle 83 extends upwardly beyond the lower portion of the U-shaped casting 88 and receives a gear sector 95 which is fixed to the upper end thereof and which meshes with a steering pinion 100 supported in the casting 88 and mounted on a steering wheel shaft 101 extending toward the rear of the tractor provided with the usual steering wheel 102.

The vertical shaft 81, which is disposed within the tubular spindle 83, extends upwardly beyond the spindle 83 and is received in a suitable socket formed in the upper arm of the casting 88. Between the upper and lower portions of the casting and fixedly secured to the upper end of the shaft 81 is a latch plate 105 of segmental form, as best shown in Figure 2, and which is provided with a notch to receive a latch lever 107 which is pivoted to an arm 108 secured to or forming a part of the gear sector 95. Spring means 110 is provided for normally urging the latch lever 107 into engagement with the notch in the latch plate 105. Whenever the lever 107 is so disposed, the tubular spindle 83, carrying the gear sector 95, is securely latched for rotation with the vertical steering shaft 81, the lower end of which is fixedly secured to the axle 80. Therefore, whenever the latch lever 107 engages the notch in the latch plate 105, actuation of the steering wheel 102 will steer the wheels 12 of the tractor in the usual manner.

During normal operation when the tractor is steered by actuation of the steering wheel 102, it is desirable to have the cultivator rigs 50 shiftable laterally when the front is steered laterally, and to this end the draft beam 60 carries a collar 120 which is connected by means of a link 121 with an arm 122 secured to the spindle 83 and rotatable therewith. Through this connection, whenever the spindle 53 is rotated through actuation of the steering wheel 102 of the tractor, the draft beam 60 is shifted in the casting 61, moving all of the cultivator rigs 50 laterally with respect to the body of the tractor. Thus, as the front steering wheels 12 are turned to steer the tractor, the cultivator tools 50 are also shifted laterally. This operation facilitates guiding the tractor and the associated tools in the cultivation of row crops and like operations.

Wheel supported tractors of the type described above are usually provided with means adapting the tractor to make a relatively sharp turn, and usually tractors of this type are provided with brake means (not shown) associated with each of the traction elements 14 and individually controlled so that, for example, one of the traction elements may be locked against rotation, in which case the usual differential mechanism (not shown) embodied in the driving connections functions to divert all of the power to the opposite traction element at the other side of the tractor, whereby the tractor will make a sharp turn about the locked traction wheel as a pivot. It is not necessary, of course, to completely stop the rotation of the braked traction element, since by means of the individual brakes either of the traction elements may be slightly retarded so as to divert a portion of the power to the opposite wheel to swing the tractor laterally. Tractors of the so-called track-laying type are of this character, and in some cases these tractors are not provided with differential mechanism but are provided with individually controlled clutches whereby the delivery of power to either of the traction elements may be interrupted so as to deliver all of the power to the opposite element for the purpose of steering the tractor. While the tractor chosen to illustrate the purposes of the present invention is of the wheel supported type, it is to be understood that the principles of the present invention are also applicable to tractors of the track-laying type.

The tractor shown in the drawings includes right and left brake pedals 130 and 131 and each is pivotally connected, as at 132, to the associated tubular housing 16 and connected with suitable brake mechanism for retarding or stopping the rotation of the traction wheel on that side of the tractor. Spring means 134 is provided for each of the brake pedals for the purpose of holding the same in upper position in which the braking means are released. Cables 136 and 137 are connected at their rear ends with the brake pedals 130 and 131 and are extended forwardly and connected with the lower end of the latch lever 107 in such a manner than when either of the brake pedals is depressed to effect steering of the tractor by the diversion of power from one traction element to the other, the latch lever 107 is swung out of the notch in the plate 105 so as to disconnect the manual steering means 102, 95, 83 from the steering spindle 81 to the lower end of which the dirigible steering wheels 12 are connected. The wheels 12 may then caster and swing laterally in any direction, all of the steering being effected by the control of the delivery of power to the traction elements.

For reasons mentioned above, it is desirable to insure that the tools 50 or other operating units shall be in raised position whenever the tractor is steered to make a sharp turn by the power means just mentioned. To this end, the present invention contemplates providing means automatically effecting the operation of the power lift 21 to raise the tools 50 to their inoperative position, if they have not already been so raised, whenever either of the brake pedals 130 and 131 are actuated to disconnect the dirigible wheels 12 from the manual steering means and to steer the tractor by the diversion of power to the traction elements 14. The mechanism for initiating the operation of the power lift in response to the operation of either of the differential brakes comprises a shaft 145 journaled in bearing openings provided in a pair of laterally spaced brackets 146 and 147 suitably secured, as by rivets, to a cross member 149 fixed to the rear end of the tractor, as by cap screws 150. Collars 153 are provided and cooperate with the brackets 146 and 147 for holding the shaft 145 in proper position.

As best seen from Figures 3, 4 and 5, the shaft 145 is mounted on the tractor adjacent the position of the differential brake pedals 130 and 131, and each of the brake pedals is provided with a block 160 fixed thereto in any manner desired and so positioned thereon as to rock the shaft 145. For this purpose, on each end of the shaft 145 a three-arm member 161 is mounted, each being disposed adjacent the brake lever on that side of the tractor. Each of the members 161 is provided with three lugs 163 which extend laterally outwardly and are disposed in the path of the leading edge of the block 160 on the associated brake lever.

The throw of the lugs 163 and the position of the associated block 160 is such that the leading edge of the block crosses the path of rotation of the lugs 163 for approximately 120 degrees of the path of the lugs, as indicated in dotted lines in Figure 5. Thus, the position of the lugs 163 does not interfere with the proper operation or the range of movement of the brake lever but, as a result of the above arrangement, whenever the foot pedal 131, referring to Figure 5, is depressed in applying the differential brake, the block 160 will contact with one of the lugs 163 and remain in contact therewith while rocking the shaft 145 through approximately 120 degrees. Such rotation of the shaft 145 will then position the next adjacent lug 163 in the position previously occupied by the preceding one. As a result, when the brake pedal is depressed at a subsequent time, the shaft 145 will again be rotated through approximately 120 degrees. When the foot pedal 131 is released after being depressed the upward movement of the brake pedal, under the action of the spring 134, will bring the cam surface 165 on the lug 160 into contact with the next succeeding lug 163, and this will cause the shaft 145 to rotate backwardly a sufficient amount to permit the block 160 to pass the lug, but as soon as the block clears the lug, the shaft 145 will be rotated back again to the position to which it was rotated by depressing the brake pedal 131. This is accomplished by means which will now be described.

A cam member 170 is mounted on the left portion of the shaft 145, the member 170 being keyed onto the shaft 145 in slidable but non-rotatable relation. The member 170 is provided with three radially extending cam projections 171 spaced apart an angular distance of approximately 120 degrees, and in one position the member 170 is arranged so that the cam projections 171 engage the power lift trip lever 35 and rock the same about its pivot axis 41 when the shaft 145 is rotated 120 degrees. Thus, referring to Figure 5, whenever either of the brake pedals is depressed to apply the corresponding differential brake the rock shaft 145 will be rotated through substantially 120 degrees. With the member 170 in a position to engage the trip lever 35 (the position shown in Figure 3), the rotation of the shaft 145 and the member 170 brings one of the cam sections against the trip lever 35 to swing the same in a counter clockwise direction, exerting a pull on the link 37 and disengaging the latch 30 against the action of the spring 31.

A plate 173 is pivotally mounted on the bolt 41 on which the trip lever 35 is carried, and preferably the bolt 41 is extended to and partially carried by a hanger 174 supported from the cross bar 149. A spring 175 encircles the bolt 41 and has one end 176 hooked over the hanger 174 and the other engaging the plate. The spring 175 thus yieldingly holds the plate 173 against the cam member 170, the plate engaging one of the projections 171 and the cam surface between that projection and the succeeding one, as best shown in Figure 5. The plate member 173, acting under the bias of the spring 175, serves to restrict the rotation of the shaft 145 to substantially 120 degrees so that the lugs carried on the plates 161 will always be in a position to be engaged by the blocks 160 when either of the differential brakes 130 and 131 is applied.

The relative position of the members 149 and 170 is such that normally the upper lug 171 is spaced sufficiently from lever 35 so that lever 35 will not be moved by the slight counter-clockwise rotation of member 170 caused by block 160 striking the upper lug 163 on its return movement.

As will be apparent, of course, the trip lever 35 can be depressed by the operator at any time to raise and lower the cultivator rigs. It may, therefore, sometimes occur that when the tractor is to be steered around a sharp turn by applying one of the differential brakes, the tools will already be in a raised position. Under these conditions, in order to prevent the operation of the power lift clutch being initiated when the power lift clutch is already in a position corresponding to the lifted position of the implement, means have been provided for disabling or rendering ineffective the connections between the differential brake means and the power lift mechanism. To this end, the member 170 is slidably mounted on the shaft 145 and mechanism is provided for moving this member out of operative relation with respect to the power lift trip lever 35 whenever the implement is in a raised position.

The mechanism for shifting the member 170 laterally comprises a forked lever 180 having arms 181 and 182 with inwardly extending lugs 184 and 185 engaging in a circumferential recess 186 formed in the hub of the member 170. The forked member 180 is pivotally connected at 188 to a bracket 189 secured to the hanger 174. The end of the member 180 opposite the arms 181 and 182 is connected by means of a link 192 with the crank arm 24 of the power lift 21. The plate member 173 is of sufficient width to engage the cam member 170 in both its full line position and its dotted line position, as best shown in Figures 3 and 4.

When the power lift crank 24 is in the position shown in Figure 1, the tools or units 50 are in their lowered or operating position and the lever 180 is disposed in the position shown in full lines in Figure 3 with the member 170 in operative relation with respect to the trip lever 35. In this position, when the rock shaft 145 is rotated by depressing one of the differential brake levers, rotation of the shaft 145 trips the power lift and causes the crank arm 24 to swing rearwardly to raise the tools. This movement of the crank arm 24 exerts a thrust on the link 192 which swings the lever 180 to the position shown in dotted lines in Figure 3, which disposes the member 170 out of engagement with the trip lever 35. Now it is apparent, if one of the differential brakes be applied subsequently, that the shaft 145 will be rocked but such movement will not trip the lever 35 because the member 170 is out of engagement therewith. By this means, therefore, the operation of one of the differential brakes will not actuate the power lift unless the same is in a position corresponding to a lowered or operating position of the tools. If the power lift is in a raised position, the connections between the power lift and the differential brake means are interrupted and rendered ineffective.

It is important to note that whenever the brake levers 130 and 131, or either one of them, are actuated, the dirigible means or steering wheels 12 are disconnected from the manual steering means 102 and that the lateral shifted position of the tools 50 is left under the control of the manual steering means 102. Broadly considered, therefore, I have provided a construction embodying steering means of a character that when the steering means is actuated to effect a sharp turn, the tools or other operating units are automatically raised to an inoperative position but that the tools are not raised to inoperative position so long as the tractor is steered during normal operation and the lateral steering deviations are not excessive. It is also important to note that I have provided a construction wherein the lateral position of the tools are automatically controlled in accordance with normal deviations occurring during normal steering or row following operations, but that when the steering mechanism is so activated as to effect a sharp turn, the connections with the tools, whereby their lateral position were controlled, are interrupted and the control of the lateral position of the tools is transferred to other means. In this way, there is no danger that the mechanism for effecting a sharp turn will disturb the lateral positioning of the operating units or in any way move them out of their proper position.

It is also to be noted that, within the limits provided by virtue of the cable connections 136 and 137 and the relations between the differential brake levers and the rock shaft and associated structure operated thereby, it is possible to effect some steering control by actuation of the differential brakes without effecting the operation of the power lift or the disconnection of the normal steering means and automatic lateral control of the tools.

While I have shown and described above the preferred structure in which the principles of the present invention have been embodied, it is to be understood that my invention is not to be limited to the specific details shown, but that, in fact, widely different means may be employed in the practice of the broader aspects of my invention.

What I claim, therefore, and desire to secure by Letters Patent is:

1. The combination with a tractor having a driver on each side of the tractor and means for unbalancing the flow of power to said drivers and a power lift, of an implement associated with the tractor and connected with the power lift to be raised and lowered thereby, and means responsive to the operation of said first means for initiating the operation of said power lift.

2. The combination with a tractor having steering means and a power lift, of means actuated by said steering means for operating said power lift.

3. The combination with a tractor having mechanism for steering the same, of an operating unit shiftable vertically into and out of operative position and shiftable laterally relative to the tractor, and means associated with said steering mechanism for controlling both the vertical and lateral positions of said unit.

4. The combination with a tractor having traction elements and mechanism for controlling the application of power to said traction elements for steering purposes, of an operating unit carried by the tractor and shiftable into and out of operative and inoperative positions, and means actuated by said controlling mechanism for automatically shifting said unit from one position to another when steering is to be accomplished by said traction elements.

5. The combination with a tractor having traction elements and means controlling the same to effect relatively sharp turns, of soil engaging tools movable to and from operative position, and means actuated by said controlling means for moving said tools out of operative position when negotiating relatively sharp turns.

6. The combination with a tractor having dirigible means, traction elements, and additional mechanism for optionally controlling the application of power to said traction elements for steering purposes, of soil engaging tools movable to and from operative position and shiftable laterally concomitantly with said dirigible means, and means actuated by said additional steering mechanism for moving said tools to inoperative position and disconnecting them from said dirigible means.

7. The combination with a tractor having dirigible supporting means, manually controlled means connected therewith for actuating the same, traction elements, and additional mechanism controlling said traction elements to effect relatively sharp turns, of soil engaging tools shiftable laterally in response to actuation of said dirigible supporting means and movable to and from inoperative position, and means actuated by the operation of said additional steering mechanism for disconnecting both said manual steering means and said tools from said dirigible supporting means.

8. The combination with a tractor having steering means and a power lift, of a soil engaging tool operatively connected with said power lift to be raised and lowered thereby and connected with said steering means to be shifted laterally therewith, and means adapted to actuate the power lift and simultaneously disconnect said tool from said steering means.

9. The combination with a tractor having steering means, a power lift, traction elements at each side of the tractor, and mechanism for controlling the application of power to said elements for steering purposes to supplant the control effected by said steering means, of means actuated by said mechanism for disconnecting said steering means, and separate means also controlled by said mechanism for actuating said power lift.

10. The combination with a tractor having traction elements, means for steering the tractor for normal row following operation, and means controlling said traction elements to effect relatively sharp turns, of soil engaging tools movable to and from operative position, means actuated by said controlling means for moving said tools out of operative position when negotiating relatively sharp turns, and means also actuated by said controlling means when negotiating relatively sharp turns for interrupting the control effected by said steering means.

11. The combination with a tractor having differential brakes, a lever for each brake to control the operation thereof, a power lift, and an implement associated with the tractor and connected with the power lift to be raised and lowered thereby, of means responsive to the operation of either brake lever for initiating the operation of said power lift.

12. The combination with a tractor having differential brakes, a lever for each brake to control the operation thereof, a power lift, and an implement associated with the tractor and connected with the power lift to be raised and lowered thereby, of means responsive to the operation of either brake lever for initiating the operation of said power lift, and means responsive to the operation of said power lift in raising the implement for disabling said last named means whereby when the implement is in raised position operation of said brake levers will not initiate the operation of said power lift.

13. A tractor comprising a pair of traction wheels, brake mechanism for each of said wheels, a steering wheel, steering means, a clutch operatively connecting said steering means with said steering wheel, a brake pedal for actuating each of said brake mechanisms, a transversely extending rock shaft supported adjacent said brake pedals, means associated therewith whereby actuation of either of said brake pedals rocks said rock shaft, power lift mechanism on the tractor, and control means therefor connected with said rock shaft whereby rocking of said rock shaft operates said power lift mechanism.

14. The combination with a tractor having differential brakes, a lever for each brake to control the operation thereof, a power lift, and an implement associated with the tractor and connected with the power lift to be raised and lowered thereby, of means responsive to the operation of either brake lever for initiating the operation of said power lift, said means comprising a shaft journaled on the tractor, means on said shaft in the path of each brake lever adapted to be engaged thereby when the lever is actuated to rock the shaft, and means operated by the rotation of said shaft for initiating the operation of said power lift.

15. The combination with a tractor having differential brakes, a lever for each brake to control the operation thereof, a power lift, and an implement associated with the tractor and connected with the power lift to be raised and lowered thereby, of means responsive to the operation of either brake lever for initiating the operation of said power lift, said means comprising a shaft journaled on the tractor, means on said shaft in the path of each brake lever and adapted to be engaged thereby when the lever is actuated to rock the shaft, a trip lever for initiating the operation of said power lift, and means on said shaft in the path of said trip lever for actuating the latter when said shaft is rocked.

16. The combination with a tractor having differential brakes, a lever for each brake to control the operation thereof, a power lift, and an implement associated with the tractor and connected with the power lift to be raised and lowered thereby, of means responsive to the operation of either brake lever for initiating the operation of said power lift, said means comprising a shaft journaled on the tractor, means on said shaft in the path of each brake lever and adapted to be engaged thereby when the lever is actuated to rotate the shaft, a trip lever for initiating the operation of said power lift, means shiftably mounted on said shaft in the path of said trip lever for actuating said lever when the shaft is rotated, and means for shifting said last named means out of the path of said trip lever.

17. The combination with a tractor having differential brakes, a lever for each brake to control the operation thereof, a power lift, and an implement associated with the tractor and connected with the power lift to be raised and lowered thereby, of means responsive to the operation of either brake lever for initiating the operation of said power lift, said means comprising a shaft journaled on the tractor, means on said shaft in the path of each brake lever and adapted to be engaged thereby when the lever is actuated to rock the shaft, means for initiating the operation of said power lift, shiftable means mounted on said shaft and adapted to be disposed in the path of said last named means for actuating the latter when said shaft is rocked, and means responsive to the operation of said power lift in lifting the implement for moving said shiftable means out of the path of said initiating means.

18. In combination, a tractor having a steering wheel and a front steering truck, a vertically disposed shaft fixed to said truck, a tubular spindle in which said shaft is journaled, means operatively connecting said spindle to the steering wheel whereby said spindle is rotated responsive to the operation of the steering wheel, an implement associated with the tractor and adapted to be shifted laterally with respect to the tractor, an operative connection between the implement and said spindle whereby said implement is shifted laterally of the tractor whenever said spindle is rotated, and means for connecting said shaft and said spindle to rotate in unison whereby operation of said steering wheel will steer said truck and simultaneously shift said implement laterally, said last named means being disconnectible whereby when said shaft and said spindle are disconnected said truck is free to turn independently of said steering wheel and said implement may be held against lateral shifting through said steering wheel.

19. In combination, a tractor having a steering wheel, a front steering truck, and a pair of differential brakes, a shaft fixed to said truck, a spindle, means operatively connecting said spindle to said steering wheel whereby said spindle is rotated responsive to the operation of said steering wheel, an implement associated with the tractor and adapted to be shifted with respect to the tractor, an operative connection between the implement and said spindle whereby said implement is shifted whenever said spindle is rotated, said shaft being normally connected with said spindle to rotate in unison therewith whereby said truck is steered under the control of said steering wheel, and means responsive to the operation of either differential brake for disconnecting said shaft from said spindle to free said truck from said steering wheel whereby said truck may thereafter turn independently of said steering wheel and said implement may be held against shifting through said steering wheel.

20. The combination with a tractor having a brake lever and a power lift including trip lever mechanism, of a rock shaft journaled adjacent said brake lever and provided with means thereon adapted to be disposed in the path of movement of said lever throughout at least a portion of its range of movement, means carried by said rock shaft for operating said mechanism, and means serving to maintain said rock shaft in a position in which the means thereon is disposed in the path of said brake lever.

THEOPHILUS BROWN.